US012664744B2

(12) United States Patent
Kobel

(10) Patent No.: US 12,664,744 B2
(45) Date of Patent: Jun. 23, 2026

(54) SYSTEMS AND METHODS FOR A VIRTUAL LIFT DEVICE

(71) Applicant: Oshkosh Corporation, Oshkosh, WI (US)

(72) Inventor: Korry D. Kobel, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 117 days.

(21) Appl. No.: 18/509,769

(22) Filed: Nov. 15, 2023

(65) Prior Publication Data

US 2024/0161437 A1     May 16, 2024

Related U.S. Application Data

(60) Provisional application No. 63/425,865, filed on Nov. 16, 2022.

(51) Int. Cl.
*G06T 19/20*        (2011.01)
*G06Q 30/0601*      (2023.01)
(Continued)

(52) U.S. Cl.
CPC ......... *G06T 19/20* (2013.01); *G06Q 30/0601* (2013.01); *G06T 17/00* (2013.01);
(Continued)

(58) Field of Classification Search
None
See application file for complete search history.

(56) References Cited

U.S. PATENT DOCUMENTS

| | | | |
|---|---|---|---|
| 2017/0046877 A1* | 2/2017 | Hustad | G06F 3/011 |
| 2019/0287079 A1* | 9/2019 | Shiraishi | G07C 5/0841 |

(Continued)

FOREIGN PATENT DOCUMENTS

WO        WO-2021/108680 A1      6/2021

OTHER PUBLICATIONS

Hasan, Syed Mobeen, et al. "Augmented reality and digital twin system for interaction with construction machinery." Journal of Asian Architecture and Building Engineering 21.2 (2022): 564-574.*

(Continued)

*Primary Examiner* — Ryan M Gray
(74) *Attorney, Agent, or Firm* — Foley & Lardner LLP

(57)        ABSTRACT

A system for digital twinning a lift device includes a lift device, and processing circuitry. The lift device includes at least one of a sensor, a device, or an electronic control system. The processing circuitry is configured to obtain machine-specific data from the at least one of the sensor, device, or the electronic control system of the lift device. The processing circuitry is also configured to obtain a user input regarding a requested configuration of the lift device. The processing circuitry is further configured to generate a virtual lift device using the requested configuration of the lift device and the machine-specific data obtained from the lift device. The processing circuitry is further configured to operate a user device to present the virtual lift device according to the requested configuration in a virtual environment of a webpage or in an augmented reality environment.

20 Claims, 7 Drawing Sheets

(51) Int. Cl.
    *G06T 17/00*          (2006.01)
    *G06T 19/00*          (2011.01)

(52) U.S. Cl.
    CPC ........ *G06T 19/006* (2013.01); *G06T 2200/24*
        (2013.01); *G06T 2219/2008* (2013.01)

(56) References Cited

U.S. PATENT DOCUMENTS

| | | | |
|---|---|---|---|
| 2020/0095105 A1 | 3/2020 | Yutzy et al. | |
| 2020/0234498 A1* | 7/2020 | Price | G06T 7/12 |
| 2020/0410762 A1* | 12/2020 | Deck | G06T 19/006 |
| 2021/0060366 A1 | 3/2021 | Minnick et al. | |
| 2021/0279695 A1* | 9/2021 | Rice | G06Q 20/12 |
| 2021/0279914 A1 | 9/2021 | Shoup et al. | |
| 2022/0194769 A1 | 6/2022 | Kobel et al. | |
| 2022/0198905 A1 | 6/2022 | Brulo et al. | |
| 2022/0227612 A1 | 7/2022 | Kobel et al. | |
| 2022/0227613 A1 | 7/2022 | Boroni et al. | |
| 2022/0227614 A1 | 7/2022 | Yutzy et al. | |
| 2022/0229415 A1 | 7/2022 | Kobel et al. | |
| 2022/0229431 A1 | 7/2022 | Kobel et al. | |
| 2022/0229523 A1 | 7/2022 | Kobel et al. | |
| 2022/0229872 A1 | 7/2022 | Kobel et al. | |
| 2022/0230224 A1 | 7/2022 | Kobel et al. | |
| 2022/0230488 A1 | 7/2022 | Kobel et al. | |
| 2022/0230523 A1 | 7/2022 | Kobel et al. | |
| 2022/0232352 A1 | 7/2022 | Kobel et al. | |
| 2022/0232649 A1 | 7/2022 | Kobel et al. | |
| 2022/0332556 A1 | 10/2022 | Kobel et al. | |
| 2023/0046835 A1 | 2/2023 | Kobel et al. | |
| 2023/0131482 A1 | 4/2023 | Kobel et al. | |
| 2023/0142225 A1 | 5/2023 | Kobel et al. | |
| 2023/0192464 A1 | 6/2023 | Boroni et al. | |
| 2023/0195293 A1 | 6/2023 | Kobel et al. | |
| 2023/0196688 A1 | 6/2023 | Kobel et al. | |
| 2023/0224680 A1 | 7/2023 | Kobel et al. | |
| 2023/0247390 A1 | 8/2023 | Kobel et al. | |
| 2023/0358020 A1 | 11/2023 | Kobel et al. | |
| 2023/0368281 A1 | 11/2023 | Kobel et al. | |
| 2023/0371100 A1 | 11/2023 | Kobel et al. | |
| 2023/0417899 A1 | 12/2023 | Kobel et al. | |
| 2024/0035254 A1 | 2/2024 | Linsmeier et al. | |
| 2024/0043253 A1 | 2/2024 | Kobel et al. | |

OTHER PUBLICATIONS

International Search Report and Written Opinion issued in connection with PCT/US2023/079829 dated Mar. 21, 2024.
Ouadoudi Marouane et al: "Development of a Digital Twin for an Elevator System", WSEAS Transactions on Systems and Controls, vol. 17, May 4, 2022 (May 4, 2022), pp. 214-221, XP093137562, GR ISSN: 1991-8763, DOI: 10.37394/23203.2022.17.25 Retrieved from the Internet: URL:https://wseas.com/journals/sac/2022/a505103-010(2022).pdf.

* cited by examiner

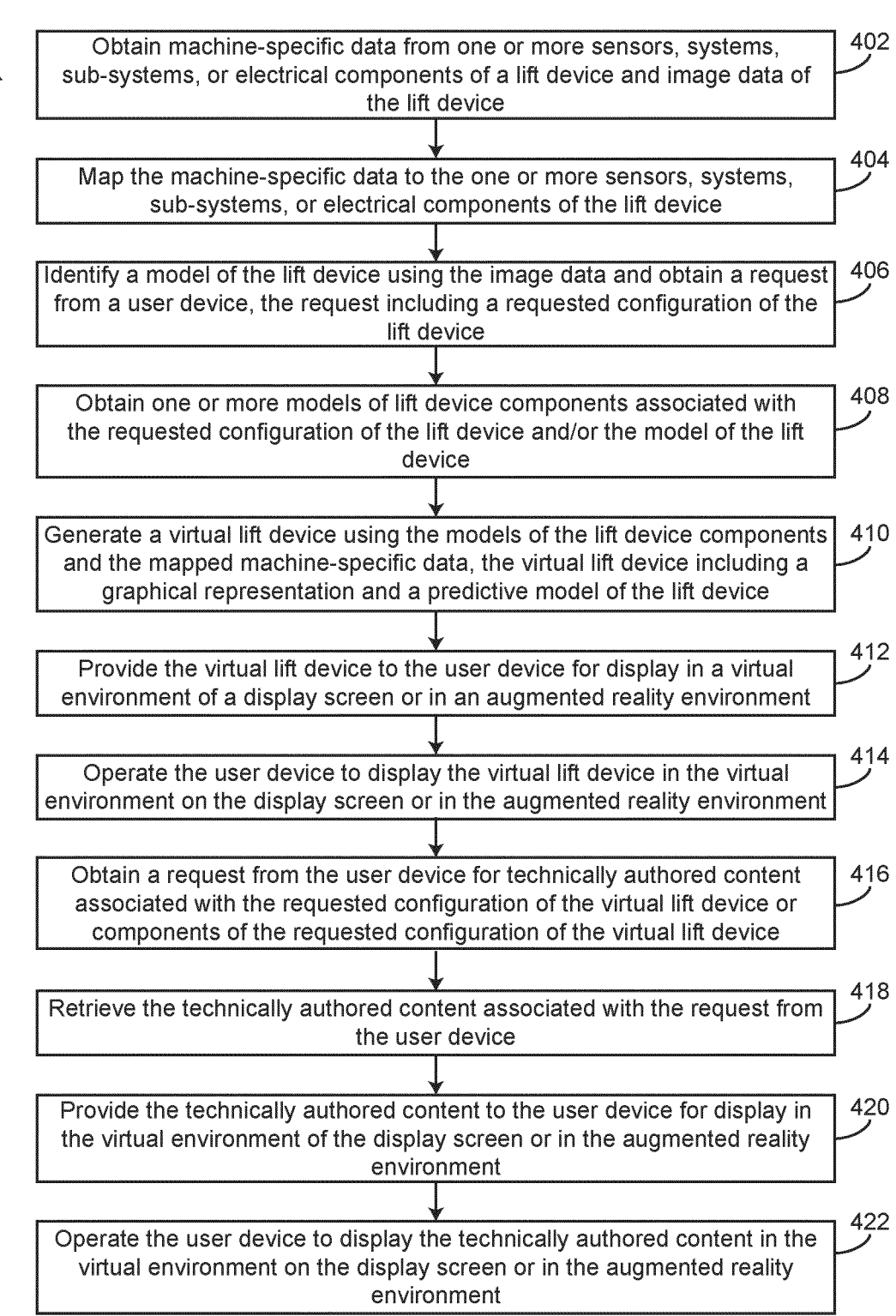

400

| | |
|---|---|
| Obtain machine-specific data from one or more sensors, systems, sub-systems, or electrical components of a lift device and image data of the lift device | 402 |
| Map the machine-specific data to the one or more sensors, systems, sub-systems, or electrical components of the lift device | 404 |
| Identify a model of the lift device using the image data and obtain a request from a user device, the request including a requested configuration of the lift device | 406 |
| Obtain one or more models of lift device components associated with the requested configuration of the lift device and/or the model of the lift device | 408 |
| Generate a virtual lift device using the models of the lift device components and the mapped machine-specific data, the virtual lift device including a graphical representation and a predictive model of the lift device | 410 |
| Provide the virtual lift device to the user device for display in a virtual environment of a display screen or in an augmented reality environment | 412 |
| Operate the user device to display the virtual lift device in the virtual environment on the display screen or in the augmented reality environment | 414 |
| Obtain a request from the user device for technically authored content associated with the requested configuration of the virtual lift device or components of the requested configuration of the virtual lift device | 416 |
| Retrieve the technically authored content associated with the request from the user device | 418 |
| Provide the technically authored content to the user device for display in the virtual environment of the display screen or in the augmented reality environment | 420 |
| Operate the user device to display the technically authored content in the virtual environment on the display screen or in the augmented reality environment | 422 |

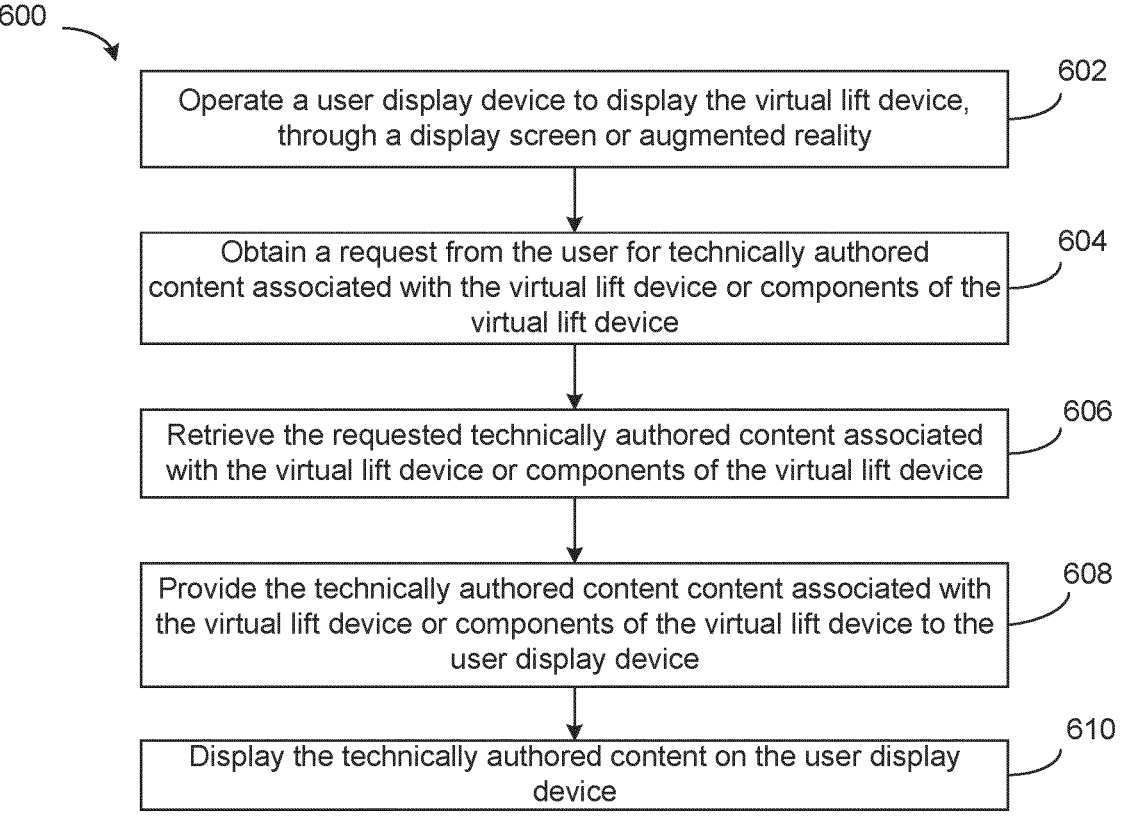

602 Operate a user display device to display the virtual lift device, through a display screen or augmented reality 604 Obtain a request from the user for technically authored content associated with the virtual lift device or components of the virtual lift device 606 Retrieve the requested technically authored content associated with the virtual lift device or components of the virtual lift device 608 Provide the technically authored content content associated with the virtual lift device or components of the virtual lift device to the user display device 610 Display the technically authored content on the user display device

FIG. 6

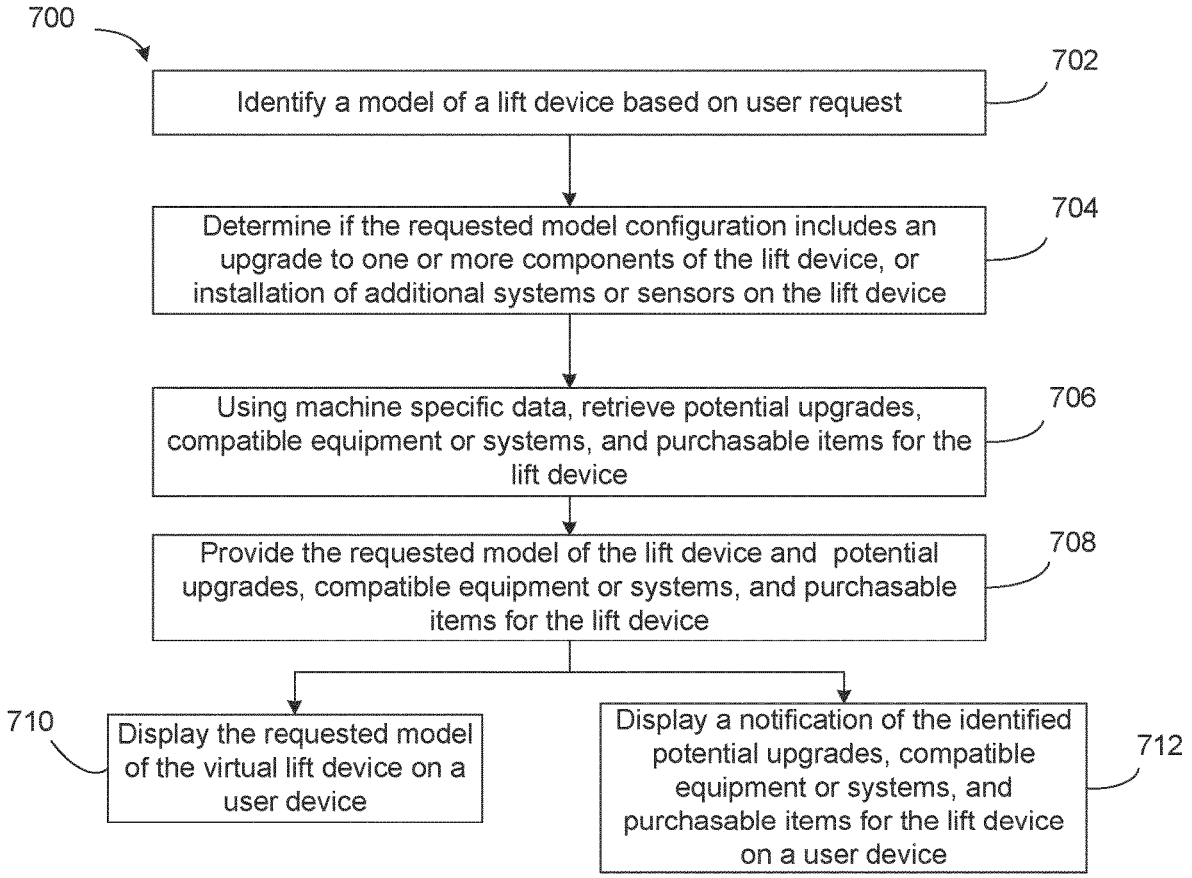

700

Identify a model of a lift device based on user request    702

Determine if the requested model configuration includes an upgrade to one or more components of the lift device, or installation of additional systems or sensors on the lift device    704

Using machine specific data, retrieve potential upgrades, compatible equipment or systems, and purchasable items for the lift device    706

Provide the requested model of the lift device and potential upgrades, compatible equipment or systems, and purchasable items for the lift device    708

710    Display the requested model of the virtual lift device on a user device

Display a notification of the identified potential upgrades, compatible equipment or systems, and purchasable items for the lift device on a user device    712

FIG. 7

SYSTEMS AND METHODS FOR A VIRTUAL LIFT DEVICE

CROSS-REFERENCE TO RELATED PATENT APPLICATION

The present application claims the benefit of and priority to U.S. Provisional Patent Application No. 63/425,865, filed Nov. 16, 2022, the entire disclosure of which is incorporated by reference herein.

BACKGROUND

The present invention generally relates to the field of lift devices, and in particular, to display systems for lift devices.

SUMMARY

One implementation of the present disclosure relates to a system for digital twinning a lift device, according to some embodiments. In some embodiments, the system includes a lift device, and processing circuitry. In some embodiments, the lift device includes at least one of a sensor, a device, or an electronic control system. In some embodiments, the processing circuitry is configured to obtain machine-specific data from the at least one of the sensor, device, or the electronic control system of the lift device. In some embodiments, the processing circuitry is further configured to obtain a user input regarding a requested configuration of the lift device. In some embodiments, the processing circuitry is further configured to generate a virtual lift device using the requested configuration of the lift device and the machine-specific data obtained from the lift device. In some embodiments, the processing circuitry is further configured to operate a user device to present the virtual lift device according to the requested configuration in a virtual environment of a webpage or in an augmented reality environment.

In some embodiments, the virtual lift device includes a three-dimensional model of the lift device according to the requested configuration and the machine-specific data. In some embodiments, different portions of the machine-specific data are mapped to corresponding components of the virtual lift device.

In some embodiments, the virtual lift device further includes a predictive model configured to predict one or more properties of the lift device for the requested configuration as a function of one or more control decisions for the virtual lift device. In some embodiments, generating the virtual lift device includes retrieving one or more three-dimensional models of lift device components according to the requested configuration and assembling the three-dimensional model of the lift device using the retrieved three-dimensional models.

In some embodiments, the user device is configured to access the webpage through an Internet connection with the processing circuitry. In some embodiments, the webpage is a sales webpage. In some embodiments, the requested configuration is a configuration for the lift device including a component to be purchased on the sales webpage.

In some embodiments, the sales webpage includes a purchase button, the virtual environment, and an orbiting button. In some embodiments, the virtual lift device is displayed in the virtual environment and is orbited in the virtual environment responsive to user selection of the orbiting button.

In some embodiments, the user device functions as an augmented reality (AR) device. In some embodiments, the AR device is configured to overlay one or more components of the virtual lift device in the augmented reality environment.

One implementation of the present disclosure relates to displaying a virtual lift device by obtaining datasets from a lift device, generating a digital twin of the lift device. In some embodiments, the digital twin includes a plurality of datasets, a graphical representation or predictive model of the lift device. Some embodiments relate to receiving a request, at a user device, to display the digital twin of the lift device. The user device may be operated to provide the graphical representation of the lift device and one or more of the datasets in response to the request.

In some embodiments, the datasets are received from sensors, systems, sub-systems, or electrical components of the lift device.

In some embodiments the virtual lift device is provided with potential upgrades, compatible equipment or systems. In some embodiments the virtual lift device is provided with purchasable items, potential replacements, or timely maintenance notifications.

In some embodiments the lift device includes a sensor, a system, a sub-system, or an electrical component. The plurality of datasets of the lift device may be obtained from the sensor, the system, the sub-system, or the electrical component. Each of the datasets may be mapped to the sensor, the system, the sub-system, or the electrical component.

In some embodiments, a request is received from a user device to display a specific model configuration of the lift device. The user request for the specific model configuration may contain potential upgrades, compatible equipment or systems, purchasable items, or maintenance notifications for the lift device. In some embodiments, the user device is provided a graphical representation of the specific model configuration and potential upgrades, compatible equipment or systems, purchasable items, or maintenance notifications. The display of the user device may be operated to provide the graphical representation of the specific model configuration and one or more of the potential upgrades, compatible equipment or systems, purchasable items, or timely maintenance notifications for the lift device.

In some embodiments, the potential upgrades, compatible equipment or systems, purchasable items, or potential replacements may be overlaid onto the graphical representation of the lift device. The user device may then be operated to provide the graphical representation of the lift device and the potential upgrades, compatible equipment or systems, purchasable items, or potential replacements, according to exemplary embodiments.

In some embodiments, the display of the user device is operated to show maintenance notifications for the lift device on the graphical representation of the lift device.

One implementation of the present disclosure relates to a cloud computing system for a lift device, the cloud computing system includes cloud device comprising a processor configured to wirelessly communicate with a controller of the lift device to obtain machine specific data, and generate a digital twin of the lift device using the machine specific data, the digital twin comprising a graphical representation or a predictive model of the lift device. In some embodiments, a user device that includes a processor and a display. The processor of the user device may receive one or more digital twins from the processor of the cloud device, operate the display of the user device to provide the graphical representation or the predictive model of the one or more digital twins and the machine specific data that corresponds to the one or more digital twins, obtain a request for machine specific content, retrieve the machine specific content from the cloud computing system, and operate the display of the user device to provide the machine specific content.

In some embodiments, the machine specific content includes technically authored content, potential equipment upgrades, compatible equipment or systems, purchasable equipment, or potential replacement components.

In some embodiments the processor of the cloud device is configured to store the digital twin in a database.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which:

FIG. 4 is a flow diagram of a process for generating and presenting a virtual lift device to a user, according to some embodiments.

FIG. 6 is a flow diagram of a process for displaying technically authored content based on user request, according to some embodiments.

FIG. 7 is a flow diagram of a process for identifying a model lift device and its potential modifications, and presenting the user with the requested model and its potential modifications.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Overview

Referring generally to the FIGURES, systems and methods for a virtual lift device system are shown, according to various exemplary embodiments. The virtual lift device system includes a controller configured to receive information from sensors and/or control units disposed in various locations on a lift device. The controller may be disposed in any suitable location on the lift device. The information is received and processed by the controller and transmitted to a remote server via a wireless radio of the controller. The remote server includes a virtual lift device which receives the information from the controller and models the information on the virtual lift device. The virtual lift device acts as a virtual or digital twin of the lift device, and may be accessed through the remote server by a variety of applications. The virtual lift device may be accessed by personal computer devices to monitor a live view of the lift device, and may write time series information of the virtual lift device to a remote database. In some embodiments, the virtual lift device may be accessed by a personal computer device with administrative access and may send commands to the controller via the remote server and the wireless radio of the controller. The commands sent to the controller may be commands corresponding to the control units and may adjust an operation of the control units of the lift device, resulting in an adjusted operation of the lift device.

In some embodiments, the remote server (e.g., a cloud computing system) is configured to provide the virtual lift device to a user device (e.g., a tablet) which may present the virtual lift device on a display screen. The virtual lift device can be presented in an augmented reality environment so that the user may physically move about the lift device and hold the user device so that a camera of the user device obtains real-time image data and presents the real-time image data to the user with one or more components or all of the components of the virtual lift device overlaid and tracked onto the image data of the lift device in real-time. In some embodiments, the virtual lift device is presented in a virtual environment on the display screen and can be orbited by operating a touch screen of the user device. In some embodiments, the virtual lift device can include call outs of information that indicate purchasable items, and a button to add the purchasable item to the user's cart.

Lift Device

Figure 1:
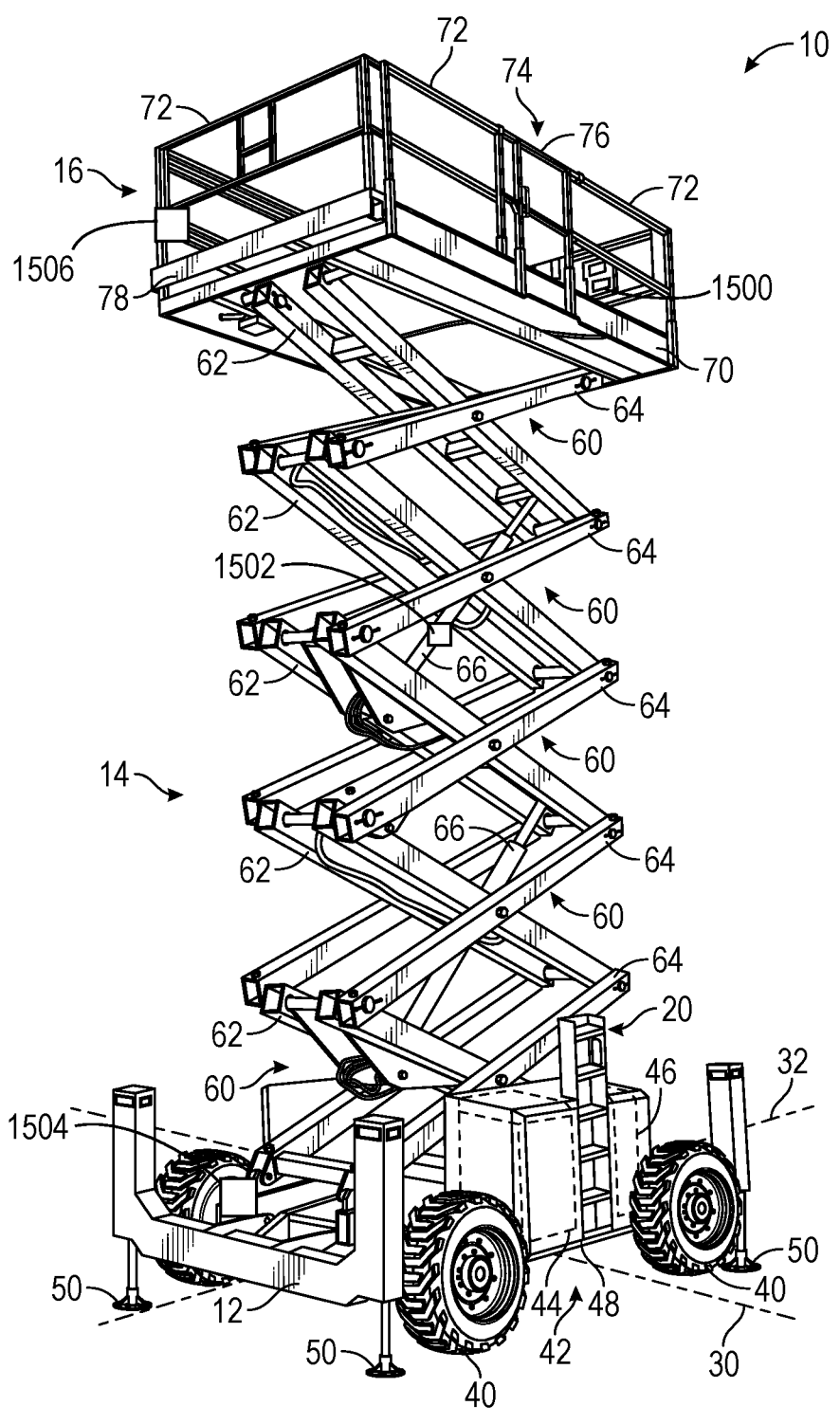
FIG. 1 is a perspective view of a lift device, according to some embodiments.

According to the exemplary embodiment shown in FIG. 1, a lift device (e.g., a scissor lift, an aerial work platform, a boom lift, a telehandler, etc.), shown as lift device 10, includes a chassis, shown as frame assembly 12. A lift device (e.g., a scissor assembly, a boom assembly, etc.), shown as lift assembly 14, couples the frame assembly 12 to a platform, shown as platform 16. The frame assembly 12 supports the lift assembly 14 and the platform 16, both of which are disposed directly above the frame assembly 12. In use, the lift assembly 14 extends and retracts to raise and lower the platform 16 relative to the frame assembly 12 between a lowered position and a raised position. The lift device 10 includes an access assembly, shown as an access assembly 20, that is coupled to the frame assembly 12 and configured to facilitate access to the platform 16 from the ground by an operator when the platform 16 is in the lowered position.

Referring again to FIG. 1, the frame assembly 12 defines a horizontal plane having a lateral axis 30 and a longitudinal axis 32. In some embodiments, the frame assembly 12 is rectangular, defining lateral sides extending parallel to the lateral axis 30 and longitudinal sides extending parallel to the longitudinal axis 32. In some embodiments, the frame assembly 12 is longer in a longitudinal direction than in a lateral direction. In some embodiments, the lift device 10 is configured to be stationary or semi-permanent (e.g., a system that is installed in one location at a work site for the duration of a construction project). In such embodiments, the frame assembly 12 may be configured to rest directly on the ground and/or the lift device 10 may not provide powered movement across the ground. In other embodiments, the lift device 10 is configured to be moved frequently (e.g., to work on different tasks, to continue the same task in multiple locations, to travel across a job site, etc.).

Such embodiments may include systems that provide powered movement across the ground.

Referring to FIG. 1, the lift device 10 is supported by a plurality of tractive assemblies 40, each including a tractive element (e.g., a tire, a track, etc.), that are rotatably coupled to the frame assembly 12. The tractive assemblies 40 may be powered or unpowered. As shown in FIG. 1, the tractive assemblies 40 are configured to provide powered motion in the direction of the longitudinal axis 32. One or more of the tractive assemblies 40 may be turnable to steer the lift device 10. In some embodiments, the lift device 10 includes a powertrain system 42. In some embodiments, the powertrain system 42 includes a primary driver 44 (e.g., an engine). A transmission may receive the mechanical energy and provide an output to one or more of the tractive assemblies 40. In some embodiments, the powertrain system 42 includes a pump 46 configured to receive mechanical energy from the primary driver 44 and output a pressurized flow of hydraulic fluid. The pump 46 may supply mechanical energy (e.g., through a pressurized flow of hydraulic fluid) to individual motive drivers (e.g., hydraulic motors) configured to facilitate independently driving each of the tractive assemblies 40. In other embodiments, the powertrain system 42 includes an energy storage device (e.g., a battery, capacitors, ultra-capacitors, etc.) and/or is electrically coupled to an outside source of electrical energy (e.g., a standard power outlet). In some such embodiments, one or more of the tractive assemblies 40 include an individual motive driver (e.g., a motor that is electrically coupled to the energy storage device, etc.) configured to facilitate independently driving each of the tractive assemblies 40. The outside source of electrical energy may charge the energy storage device or power the motive drivers directly. The powertrain system 42 may additionally or alternatively provide mechanical energy (e.g., using the pump 46, by supplying electrical energy, etc.) to one or more actuators of the lift device 10 (e.g., the leveling actuators 50, the lift actuators 66, etc.). One or more components of the powertrain system 42 may be housed in an enclosure, shown as housing 48. The housing 48 is coupled to the frame assembly 12 and extends from a side of the lift device 10 (e.g., a left or right side). The housing 48 may include one or more doors to facilitate access to components of the powertrain system 42.

In some embodiments, the frame assembly 12 is coupled to one or more actuators, shown in FIG. 1 as leveling actuators 50. The lift device 10 includes four leveling actuators 50, one in each corner of the frame assembly 12. The leveling actuators 50 extend and retract vertically between a stored position and a deployed position. In the stored position, the leveling actuators 50 are raised and do not contact the ground. In the deployed position, the leveling actuators 50 contact the ground, lifting the frame assembly 12. The length of each of the leveling actuators 50 in their respective deployed positions may be varied to adjust the pitch (i.e., rotational position about the lateral axis 30) and the roll (i.e., rotational position about the longitudinal axis 32) of the frame assembly 12. Accordingly, the lengths of the leveling actuators 50 in their respective deployed positions may be adjusted such that the frame assembly 12 is leveled with respect to the direction of gravity, even on uneven or sloped terrains. The leveling actuators 50 may additionally lift the tractive elements of the tractive assemblies 40 off the ground, preventing inadvertent driving of the lift device 10.

Referring to FIG. 1, the lift assembly 14 includes a number of subassemblies, shown as scissor layers 60, each including a first member, shown as inner member 62, and a second member, shown as outer member 64. In each scissor layer 60, the outer member 64 receives the inner member 62. The inner member 62 is pivotally coupled to the outer member 64 near the centers of both the inner member 62 and the outer member 64. Accordingly, inner member 62 pivots relative to the outer member 64 about a lateral axis. The scissor layers 60 are stacked atop one another to form the lift assembly 14. Each inner member 62 and each outer member 64 has a top end and a bottom end. The bottom end of each inner member 62 is pivotally coupled to the top end of the outer member 64 immediately below it, and the bottom end of each outer member 64 is pivotally coupled to the top end of the inner member 62 immediately below it. Accordingly, each of the scissor layers 60 are coupled to one another such that movement of one scissor layer 60 causes a similar movement in all of the other scissor layers 60. The bottom ends of the inner member 62 and the outer member 64 belonging to the lowermost of the scissor layers 60 are coupled to the frame assembly 12. The top ends of the inner member 62 and the outer member 64 belonging to the uppermost of the scissor layers 60 are coupled to the platform 16. The inner members 62 and/or the outer members 64 are slidably coupled to the frame assembly 12 and the platform 16 to facilitate the movement of the lift assembly 14. Scissor layers 60 may be added to or removed from the lift assembly 14 to increase or decrease, respectively, the maximum height that the platform 16 is configured to reach.

One or more actuators (e.g., hydraulic cylinders, pneumatic cylinders, motor-driven leadscrews, etc.), shown as lift actuators 66, are configured to extend and retract the lift assembly 14. As shown in FIG. 1, the lift assembly 14 includes a pair of lift actuators 66. Lift actuators 66 are pivotally coupled to an inner member 62 at one end and pivotally coupled to another inner member 62 at the opposite end. These inner members 62 belong to a first scissor layer 60 and a second scissor layer 60 that are separated by a third scissor layer 60. In other embodiments, the lift assembly 14 includes more or fewer lift actuators 66 and/or the lift actuators 66 are otherwise arranged. The lift actuators 66 are configured to actuate the lift assembly 14 to selectively reposition the platform 16 between the lowered position, where the platform 16 is proximate the frame assembly 12, and the raised position, where the platform 16 is at an elevated height. In some embodiments, extension of the lift actuators 66 moves the platform 16 vertically upward (extending the lift assembly 14), and retraction of the linear actuators moves the platform 16 vertically downward (retracting the lift assembly 14). In other embodiments, extension of the lift actuators 66 retracts the lift assembly 14, and retraction of the lift actuators 66 extends the lift assembly 14. In some embodiments, the outer members 64 are approximately parallel and/or contacting one another when with the lift assembly 14 in a stored position. The lift device 10 may include various components to drive the lift actuators 66 (e.g., pumps, valves, compressors, motors, batteries, voltage regulators, etc.).

Referring again to FIG. 1, the platform 16 includes a support surface, shown as deck 70, defining a top surface configured to support operators and/or equipment and a bottom surface opposite the top surface. The bottom surface and/or the top surface extend in a substantially horizontal plane. A thickness of the deck 70 is defined between the top surface and the bottom surface. The bottom surface is coupled to a top end of the lift assembly 14. In some embodiments, the deck 70 is rectangular. In some embodiments, the deck 70 has a footprint that is substantially similar to that of the frame assembly 12.

Referring again to FIG. 1, a number of guards or railings, shown as guard rails 72, extend upwards from the deck 70. The guard rails 72 extend around an outer perimeter of the deck 70, partially or fully enclosing a supported area on the top surface of the deck 70 that is configured to support operators and/or equipment. The guard rails 72 provide a stable support for the operators to hold and facilitate containing the operators and equipment within the supported area. The guard rails 72 define one or more openings 74 through which the operators can access the deck 70. The opening 74 may be a space between two guard rails 72 along the perimeter of the deck 70, such that the guard rails 72 do not extend over the opening 74. Alternatively, the opening 74 may be defined in a guard rail 72 such that the guard rail 72 extends across the top of the opening 74. In some embodiments, the platform 16 includes a door 76 that selectively extends across the opening 74 to prevent movement through the opening 74. The door 76 may rotate (e.g., about a vertical axis, about a horizontal axis, etc.) or translate between a closed position, shown in FIG. 1, and an open position. In the closed position, the door 76 prevents movement through the opening 74. In the open position, the door 76 facilitates movement through the opening 74.

Referring again to the embodiments of FIG. 1, the platform 16 further includes one or more platforms, shown as extendable decks 78, that are received by the deck 70 and that each define a top surface. The extendable decks 78 are selectively slidable relative to the deck 70 between an extended position and a retracted position. In the retracted position, shown in FIG. 1, the extendable decks 78 are completely or almost completely received by the deck 70. In the extended position, the extendable decks 78 project outward (e.g., longitudinally, laterally, etc.) relative to the deck 70 such that their top surfaces are exposed. With the extendable decks 78 projected, the top surfaces of the extendable decks 78 and the top surface of the deck 70 are all configured to support operators and/or equipment, expanding the supported area. In some embodiments, the extendable decks 78 include guard rails partially or fully enclose the supported area. The extendable decks 78 facilitate accessing areas that are spaced outward from the frame assembly 12.

Referring to FIG. 1, the access assembly 20 is coupled to a longitudinal side of the frame assembly 12. As shown in FIG. 1, the access assembly 20 is a ladder assembly extending along a longitudinal side of the frame assembly 12. The access assembly 20 is aligned with the door 76 such that, when the platform 16 is in the lowered position, the access assembly 20 facilitates access to the upper surface of the platform 16 through the opening 74.

Referring still to FIG. 1, the lift device 10 includes a controller 1500 that is configured to obtain sensor data, or machine-specific data from any of, but not limited to, control modules and sensors 1502 (e.g., a wheel speed sensor, a fuel or power level sensor, hydraulic sensors, extension sensors, etc.). Controller 1500 may communicably connect to any electronic control module, control unit, and/or sensor of the lift device 10. In some embodiments, controller 1500 receives communications from any of lift assembly sensors 1502, frame assembly sensors 1504, and/or platform assembly sensors 1506.

Controller 1500 may be configured to receive information regarding a chassis (e.g., the frame assembly 12) of the lift device 10 a body of the lift device 10 (e.g., pneumatics, hydraulics, sensors, cameras, electronics, Human-Machine-Interface (HMI), GPS, etc.), and a $3^{rd}$ party system present on the lift device 10 (e.g., an object detection system, an operator behavior system, a safety system, a weight system, etc.), according to an exemplary embodiment. According to an exemplary embodiment, controller 1500 receives information from the chassis of the lift device 10, the body of the lift device 10, and/or the lift assembly 14 through an infrastructure already present on the lift device 10. For example, controller 1500 may be configured to communicably connect with a communications system of the lift device 10 such that controller 1500 may receive information regarding the primary driver 44, the pump 46, the powertrain system 42, the lift assembly 14, the platform 16, etc.

Controller 1500 may also receive information from a third party system present on lift device 10. For example, a third party Global Positioning System (GPS) device may be disposed on the lift device 10 and may communicably connect with controller 1500. Other third party systems may include, but are not limited to an object detection system, a driver behavior system, a safety system, a weight system, etc. Controller 1500 may receive and monitor information from any of these third party systems, according to an exemplary embodiment.

Controller 1500 may communicably connect to any chassis/frame, lift assembly, platform, and third party systems of the lift device 10. In some embodiments, controller 1500 may communicably connect with an on-board diagnostics (OBD) system of lift device 10.

In some embodiments, controller 1500 may communicably connect to a bus of lift device 10. The bus of refuse lift device 10 may be a Controller Area Network (CAN) bus, a Local Interconnect Network (LIN) bus, a Media Oriented Systems Transport (MOST) bus, an SAE J1850 bus, an Inter-Integrated Circuit ($I^2C$) bus, etc., or any other communications bus. Controller 1500 may be configured to communicably connect with the bus to monitor and receive any of the information transmitted through the bus.

Virtual Lift Device System

Figure 2:
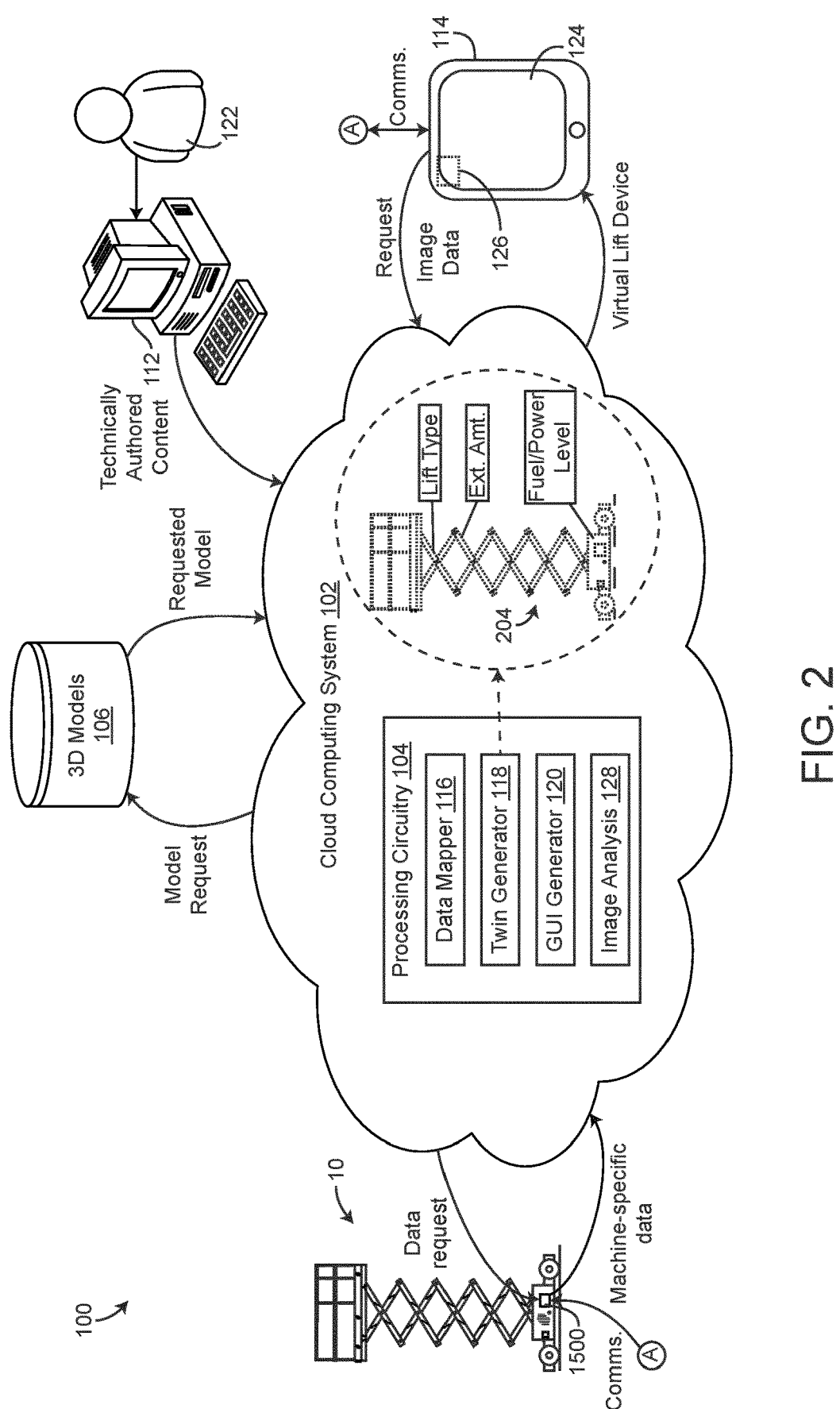
FIG. 2 is a block diagram of a cloud computing system for generating a virtual lift device, according to some embodiments.

Referring to FIG. 2, a twinning system 100 (e.g., a virtual lift device system, a digital twinning lift system, etc.) includes a cloud computing system 102 (e.g., a server, a remote server, a cloud device) that is configured to communicate with the controller 1500 of the lift device 10, a model database 106, a technician computer 112 (e.g., an authorized technician, system administrator, manager, etc.), and a user computer 114. In some embodiments, the cloud computing system 102 hosts a website or a webpage, or communicates with a server that hosts the website or webpage. In some embodiments, the user computer 114 may access a front end of the website or webpage and receive a virtual lift device 204 of the lift device 10. The cloud computing system 102 is configured to receive requests from the user computer 114 (e.g., a laptop, a desktop computer, a smartphone, a smart device, a user device with internet connectivity, etc.) and provide the virtual lift device 204, or updated versions of the virtual lift device 204 (e.g., with updated hardware, hypothetical scenarios, etc.) for display on the user computer 114. In some embodiments, the user computer 114 is communicably coupled with an augmented reality (AR) device (e.g., an AR headset, a head wearable device, AR goggles, AR glasses, AR contact lenses, etc.) or functions as an augmented reality device. In some embodiments, the user device 114 is a tablet that includes a camera or imaging device 126 and is configured to provide image data of the lift device to the cloud computing system 102. In some embodiments, the user device 114 includes a display screen 124 that can function to provide the virtual lift device 204 in a virtual environment or in an augmented reality environment. In some embodiments, the user device 114 can provide the virtual lift device 204 to a separate AR device. In some embodiments, the separate AR device is communicably coupled with the cloud computing system 102 and is configured to obtain the virtual lift device 204 or data thereof from the cloud computing system 102. In some embodiments, the user device 114 communicates with the controller 1500 of the lift device 10 to obtain information regarding a model of the lift device and provides the information to the cloud computing system 102 for use in generating the virtual lift device 204. In some embodiments, the user device 114 functions as an intermediary between the cloud computing system 102 and the lift device 10. In some embodiments, the user device 114 has an Internet connectivity (e.g., a cellular dongle) and communicates with the cloud computing system 102 to forward machine-specific data obtained from the lift device 10.

The cloud computing system 102 is shown to include processing circuitry 104. In some embodiments, the processing circuitry includes a processor and memory. The cloud computing system 102 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. In some embodiments, the processing circuitry 104 is configured to execute computer code stored in the memory to facilitate the activities described herein. The memory of the cloud computing system 102 may be any volatile or non-volatile computer-readable storage medium capable of storing data or computer code relating to the activities described herein. According to an exemplary embodiment, the memory includes computer code modules (e.g., executable code, object code, source code, script code, machine code, etc.) configured for execution by the processing circuitry 104. In some embodiments, the cloud computing system 102 represents a collection of processing devices (e.g., servers, data centers, etc.). In such cases, the cloud computing system 102 represents the collective processors of the devices, and the memory of the processing circuitry 104 represents the collective storage devices of the devices.

It should be understood that the cloud computing system 102 can represent any number of distributed processors, processing circuitry, processing units, servers, or databases. The cloud computing system 102 may be hosted at a single location, and may communicate with one or more other servers or cloud computing systems to off load processing requirements if necessary (e.g., according to network trafficking or network shaping requirements). In some embodiments, the model database 106 is also performed by the cloud computing system 102 or by a separate computing system.

The processing circuitry is shown to include a data mapper 116, a twin generator 118, and a graphical user interface (GUI) generator 120. In some embodiments, the data mapper 116 and the twin generator 118 are configured to cooperatively function to generate both a graphical representation portion of the virtual lift device 204 (e.g., a CAD model, a three-dimensional model, a visualization, visual data, etc.) and a predictive model (e.g., a mathematical model, an artificial intelligence model, a regression model, etc.) that includes or is generated based on machine-specific data mapped to various components of the lift device 10. For example, the data mapper 116 can obtain equipment or machine-specific data from the controller 1500 of the lift device 10 and map the machine-specific data to sensors, devices, actuators, systems, components, portions, members, etc., of the virtual lift device 204 of the lift device 10.

In some embodiments, the data mapper 116 is configured to use a mapping between machine-specific data of the lift device 10 and the various sensors, devices, actuators, systems, etc., of the lift device 10 from which the machine-specific data is collected. In some embodiments, the functionality of the data mapper 116 is performed by the cloud computing system 102 or by the controller 1500. The mapping may include a rule, a set of rules, identifiers, etc., that map the machine-specific data of the lift device 10 to the sensors, devices, actuators, systems, etc., from which the machine-specific data was obtained. For example, machine-specific data that relates to a fuel level, battery state of charge, or a position of the lift device 10 as obtained by a particular fuel sensor, battery sensor, or a particular global positioning system (GPS) may be assigned a particular identifier, serial number, etc., or may include the particular identifier or serial number that is read from the particular fuel sensor or GPS. In some embodiments, machine-specific data includes a tag, a label, or an identifier that indicates a type of data. For example, speed data obtained from a wheel speed sensor of the lift device 10 may be assigned a "velocity" tag by data mapper 116 so that the cloud computing system 102 may provide "velocity" data in response to a user request for speed data of the lift device 10. In some embodiments, each sensor, system, device, etc., of the lift device 10 includes a corresponding tag, identifier, label, identification number, serial number, device identifier, sensor identifier, etc., and machine-specific data obtained from each sensor, system, device, etc., includes a tag, label, or identifier. The mapping may be a mapping between the various tags, labels, identifiers, etc., of the machine-specific data and the tag, identifier, label, identification number, serial number, device identifier, sensor identifier, etc., of the various systems, actuators, sensors, devices, etc., of the lift device 10. In this way, the cloud computing system 102 and/or the controller 1500 may use the mapping to match the machine-specific data to a specific sensor, system, device, actuator, etc., of the lift device 10 or to a particular sensor of a particular lift device 10.

The twin generator 118 may obtain a request from the user device 114 to generate, assemble, determine, etc., a virtual lift device having a specific configuration. The configuration can be or include an upgrade of one or more components of the lift device 10, a replacement of one or more components or systems of the lift device 10, an installation of a new system on the lift device 10 (e.g., an obstacle detection system), or a simulated scenario or requested operation of the lift device 10. In some embodiments, the twin generator 118 is configured to provide one or more model requests to the model database 106. For example, if the request from the user device 114 is a request to view the virtual lift device 204 with a specific model of an obstacle detection system, the twin generator 118 may retrieve a three-dimensional model of the obstacle detection system and components of the detection system from the model database 106. The twin generator 118 can also obtain three-dimensional models of components of the lift device 10 itself from the model database 106 and may modify the three-dimensional models according to the machine-specific data obtained from the lift device 10. In some embodiments, the twin generator 118 is configured to arrange or assemble the three-dimensional models to generate the virtual lift device 204. In some embodiments, the twin generator 118 is configured to generate the virtual lift device 204 using the models according to the requested configuration, the machine-specific data obtained from the lift device 10 (e.g., real-world data), and the mapping between the machine-specific data and one or more components of the virtual lift device 204. For example, the machine-specific data may be mapped to three-dimensional components of the virtual lift device 204 and can be visually represented to the user by callouts or dialogue boxes that are overlaid over the graphical representation of the virtual lift device 204. In some embodiments, once the mapping is obtained and the virtual lift device 204 is provided to the user device 114, the user device 114 obtains the machine-specific data from the controller 1500 of the lift device 10 and populates various data fields using the machine-specific data and the mapping of the virtual lift device 204.

In some embodiments, the twin generator 118 is configured to generate or train a predictive model (e.g., a mathematical function, a neural network, a physics based model, etc.) for the virtual lift device 204. In some embodiments, the predictive model is selected by the twin generator 118 from a database of predetermined models. For example, the twin generator 118 may use a serial number or a model type provided with the machine-specific data from the lift device 10. The predictive model can be or include a model that predicts or estimates extension of the lift assembly 14 as a function of control operations. In some embodiments, the predictive model predicts loads and stresses on structural components of the lift device 10. In some embodiments, the predictive model estimates positions and/or angles of one or more components of the lift device 10 as a function of control decisions. In some embodiments, the predictive model estimates battery state of charge as a function of control operations, lifetime or degradation of the battery given properties of battery or energy storage on the lift device 10, etc. In some embodiments, the predictive model is a portion of the virtual lift device 204 and can be provided to the user device 114 with the virtual lift device 204.

The GUI generator 120 may be configured to generate and provide a GUI to the user device 114. In some embodiments, the GUI is a webpage. In some embodiments, the GUI generator 120 provides the virtual lift device 204 to the user device 114 as a file or data object that can be displayed on the display screen 124 of the user device 114. In some embodiments, the GUI generator 120 is configured to generate a GUI for the user device 114 that includes a list of possible upgrades, replaceable components, visual representations of the mapping between the machine-specific data and the virtual lift device 204, etc. In some embodiments, the GUI generator 120 includes a layout of a GUI (e.g., for a mobile device or a desktop device) and the virtual lift device 204.

In some embodiments, the cloud computing system 102 is configured to obtain technically authored content from the technician computer 112 or a database that is authored by a technician 122 or manufacturer. The technically authored content may be or include manuals for the lift device 10 or the specific model of the lift device 10, service manuals, diagnostic information, diagnostic manuals, operational manuals, installation instructions for new components, ratings and capabilities for new components or systems, or any other technically authored content regarding the lift device 10, components or systems of the lift device 10, or components or systems of the requested configuration of the lift device 10. For example, if the user requests to view a configuration of the virtual lift device 204 with an upgraded or modified obstacle detection system or lift assembly, the technically authored content may be an operator or user manual for the obstacle detection system or the lift assembly.

In some embodiments, the GUI generator 120 is configured to retrieve the technically authored content from the technician computer 112 or a database, responsive to receiving a request from the user device 114 to view the technically authored content, and provide the technically authored content to the user device 114. In some embodiments, the technically authored content includes schematics or diagrams that define positions and/or interrelationships of wiring, pneumatic, hydraulic, or structural components of the lift device 10. The technically authored content can be used by the twin generator 118 to generate the virtual lift device 204.

The GUI provided to the user device 114 may include the virtual lift device 204 according to the requested configuration for viewing in a virtual environment on the user device 114 (e.g., a three-dimensional environment of a webpage) or for viewing in an AR environment. In some embodiments, the display screen 124 can be viewed by an operator and overlays the virtual lift device 204 into an AR environment at a jobsite, in a shop, etc. In this way, the user device 114 may function as an AR device. The graphical representation of the virtual lift device 204 may be rendered or overlaid onto a real-world background (e.g., at a jobsite) so that the user can inspect the virtual lift device 204 in an AR environment at a jobsite. In some embodiments, the display screen 124 is configured to use portions of the graphical representation of the virtual lift device 204 that are upgraded or different relative to the lift device 10. In some embodiments, the display screen 124 displays wiring diagrams, hydraulic diagrams, electrical schematics, etc., in three-dimensions. For example, the user may hold the user device 114 and view the display screen 124 to view the virtual lift device 204 in augmented reality. The display screen 124 may overlay additional or different components of the requested configuration of the virtual lift device 204 relative to the lift device 10 so that the user is provided with a virtual upgraded version of the lift device 10 in an AR environment. As the lift device 10 is operated in real-time, the predictive model of the virtual lift device 204 may update and make new predictions based on newly obtained machine-specific data and call out or display the results of the predictive model in the AR environment (e.g., overlaid over the lift device 10).

In some embodiments, the cloud computing system 102 is configured to generate the virtual lift device 204 using any of the techniques of the controller 300 and/or the remote server 320 as described in greater detail in U.S. application Ser. No. 16/789,962, filed Feb. 13, 2020, now U.S. Pat. No. 11,380,145, the entire disclosure of which is incorporated by reference herein. In some embodiments, the cloud computing system 102 is configured to provide the virtual lift device 204 as described herein to any of a personal computer device, an enterprise resource planning (ERP) system, a maintenance system, a fleet management system, a remote database, or a sales tool, as described in U.S. application Ser. No. 16/789,962.

The processing circuitry 104 of the cloud computing system 102 also includes an image analysis manager 128 that is configured to obtain the image data from the user device 114 and perform an image recognition technique to identify a type of the lift device 10. In some embodiments, the image data is an image of a perspective view (e.g., as shown in FIG. 1) or a side view of the lift device 10. In some embodiments, the image data is an image of a decal or a serial number of the lift device 10. The image analysis manager 128 of the processing circuitry 104 can use the image data provided by the user device 114 to determine the type of the lift device 10 (e.g., a model number, a series of the lift device 10, etc.) so that the cloud computing system 102 can automatically query the model database 106 for corresponding graphical representations or three-dimensional models. In some embodiments, the image data is real-time image data provided by the user device 114. The cloud computing system 102 can be configured to overlay augmented reality information (e.g., the virtual lift device 204 or components of the virtual lift device 204, or installable components that may be purchased) in real-time on the display screen 124 of the user device 114. In some embodiments, the image data is a still or single image that is used to retrieve corresponding models of the lift device 10 from the model database 106. In some embodiments, the display screen 124 is configured to display the virtual lift device 204 on the display screen 124 so that the user can orbit the virtual lift device 204, and view a list of available upgrades, request to view an updated version of the virtual lift device 204 that includes the upgrades, view diagnostic information, view service manuals, etc. In some embodiments, the display screen 124 also overlays sensor information on the virtual lift device 204 so that the user can orbit the virtual lift device 204 on the user device 114 and view currently obtained machine-specific data.

Figure 3:
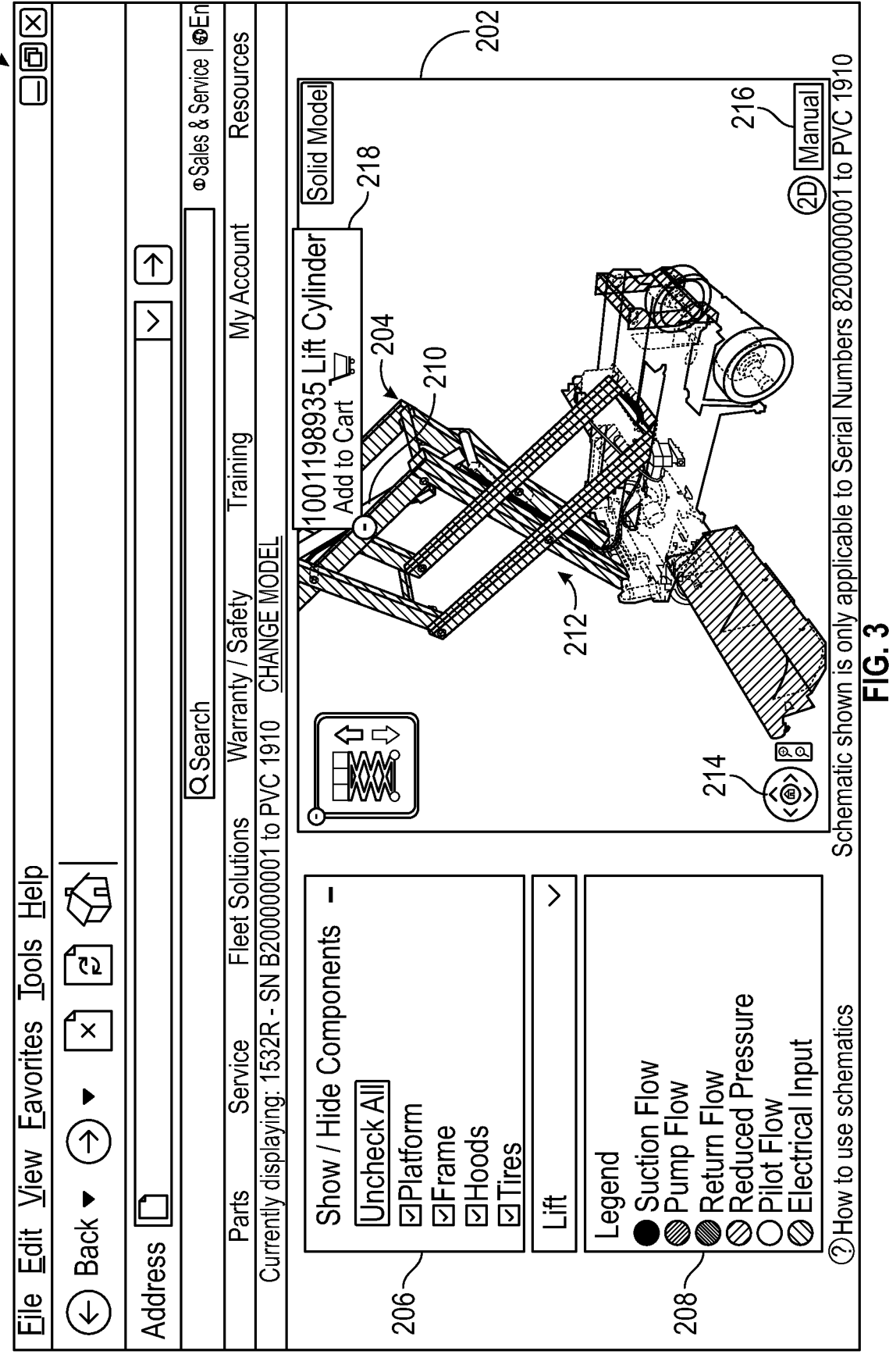
FIG. 3 is a user interface displaying the virtual lift device in a virtual environment, according to some embodiments.

Referring to FIG. 3, a GUI 200 illustrates display of the virtual lift device 204 on an e-commerce webpage. In some embodiments, the GUI 200 is displayed on the user device 114 when the user device 114 accesses a webpage. The cloud computing system 102 may function as an Internet server or communicate with an Internet server to provide the GUI 200 to a user so that the user can view the virtual lift device 204 in a virtual environment 202. In some embodiments, the virtual environment 202 includes navigation buttons 214 for orbiting, zooming, and repositioning view of the virtual lift device 204. The GUI 200 also includes a component dialogue box 206 including selectable options to show or hide one or more of the components of the virtual lift device 204 (e.g., a platform of the virtual lift device 204, a frame of the virtual lift device 204, hoods of the virtual lift device 204, tires or tractive elements of the virtual lift device 204, etc.). In some embodiments, selecting any of the options 206 results in the corresponding graphical representation or portion of the graphical representation of the virtual lift device 204 being shown in the virtual environment 202.

In some embodiments, the GUI 200 also includes a legend 208 that is color coordinated with components of the virtual lift device 204. For example, suction flow of hydraulic components may be illustrated in green, pump flow of the hydraulic components may be illustrated in red, return flow of the hydraulic components may be illustrated in blue, reduced pressure may be illustrated in orange, pilot flow may be illustrated in another red color, and electrical input may be illustrated in yellow. The GUI 200 may also include a manual button 216 which may be selected by the user and provide the technically authored content regarding the lift device 10, or a component of the lift device 10 that is currently selected or targeted.

The virtual lift device 204 includes a lift assembly model 212 that provides a graphical representation of the lift assembly 14, and a lift cylinder model 210 that provides a graphical representation of a purchasable component for the lift device 10. The lift cylinder model 210 can be retrieved by the cloud computing system 102 from the model database 106 and incorporated in the virtual environment 202 (or in the AR environment on the display screen 124). The GUI 200 also includes a purchase option 218 that, when selected by the user, adds the lift cylinder associated with the lift cylinder model 210 to the user's cart so that the user can purchase the lift cylinder associated with the lift cylinder model 210. Advantageously, the virtual lift device 204 facilitates virtual inspection of new components prior to purchasing the new components for the lift device 10.

Virtual Lift Device Process

Referring to FIG. 4, a flow diagram of a process 400 for generating and using a virtual lift device includes steps 402-422, according to some embodiments. In some embodiments, the process 400 is performed by the cloud computing system 102, or by one or more servers, processing circuits, processors, etc. Portions of the process 400 may also be performed by the user device 114 and/or the display screen 124, according to some embodiments. In some embodiments, the process 400 facilitates improved informing of a user so that the user can intelligently decide on whether to upgrade components of the lift device 10, or can perform virtual inspections of the lift device 10.

The process 400 includes obtaining machine-specific data from one or more sensors, systems, sub-systems, or electrical components of a lift device and image data of the lift device (step 402), according to some embodiments. In some embodiments, the step 402 is performed by the cloud computing system 102 and the controller 1500 of the lift device 10. The lift device 10 may include a telemetry system or a wireless transceiver configured to wirelessly communicate with the cloud computing system 102. The controller 1500 can operate the wireless transceiver or the telemetry system to provide processed, unprocessed, or time-series data to the cloud computing system 102. In some embodiments, the controller 1500 also provides tags to the cloud computing system 102 so that portions of the machine-specific data can be associated or mapped (e.g., by the cloud computing system 102) with corresponding sensors, systems, sub-systems, or electrical components of the lift device. In some embodiments, the image data is obtained from an imaging device or camera of a user device or tablet. In some embodiments, the image data is real-time image data. In some embodiments, the image data is a single image or multiple images (e.g., one or more snapshots of the lift device).

The process 400 include mapping the machine-specific data to the one or more sensors, systems, sub-systems, or electrical components of the lift device (step 404), according to some embodiments. In some embodiments, step 404 is performed by the data mapper 116 of the processing circuitry 104 of the cloud computing system 102. In some embodiments, mapping the data includes using the tags and the machine-specific data obtained in step 402 in combination with rules to map or associate portions of the machine-specific data with specific sensors, systems, sub-systems, or electrical components of the lift device 10.

The process 400 includes identifying a model of the lift device using the image data and/or obtaining a request from a user device, the request including a requested configuration of the lift device (step 406), according to some embodiments. In some embodiments, the request is provided by a user device such as a desktop computer, a laptop, a smartphone, a lift device computer, etc., or any other device that has Internet connectivity and can communicate with the cloud computing system 102. In some embodiments, the requested configuration is any of an upgrade to one or more components of the lift device 10, replacement of one or more components of the lift device 10, or installation of additional systems or sensors on the lift device 10 (e.g., installation of an obstacle detection system or a new platform assembly). In some embodiments, the request is provided at a webpage that the user device accesses. In some embodiments, the webpage is provided by the cloud computing system 10s2 and includes, based on a known type of the lift device 10, a list of potential upgrades, compatible equipment or systems, purchasable items for the lift device 10, etc. In some embodiments, the image data is an image of the lift device 10 or a plate of the lift device 10. In some embodiments, the image data is used by the image analysis manager 128 of the processing circuitry 104 of the cloud computing system 102 to identify the model of the lift device 10 and retrieve corresponding models (e.g., CAD models) for the model of the lift device 10.

The process 400 includes obtaining one or more models of lift device components associated with the requested configuration of the lift device (step 408), according to some embodiments. In some embodiments, step 408 is performed by the cloud computing system 102 by querying or requesting appropriate models (e.g., CAD models, three-dimensional models, graphical representations, visualizations, etc.) from the model database 106 according to the requested configuration for the lift device. For example, if the requested configuration is to upgrade lift cylinders or actuators of the lift device 10, the cloud computing system 102 may retrieve three-dimensional models of the upgraded lift cylinders from the model database 106.

The process 400 includes generating a virtual lift device using the models of the lift device components and the mapped machine-specific data, the virtual lift device including a graphical representation and a predictive model of the lift device (step 410), according to some embodiments. In some embodiments, the graphical representation of the virtual lift device is a CAD model that illustrates geometry of components of the virtual lift device and configuration or arrangement of the components of the virtual lift device (e.g., interrelationships between the different components of the lift device). In some embodiments, the machine-specific data is mapped to the various components of the virtual lift device and can be displayed or overlaid on the virtual lift device when displayed in a three dimensional environment (e.g., a virtual environment, an augmented reality environment, a virtual reality environment). In some embodiments, the predictive model of the virtual lift device is configured to predict one or more properties of the lift device (e.g., angles, degrees of extension, loads, hydraulic pressures, state of charge of batteries, etc.) as a function of one or more control decisions for the lift device and/or one or more conditions of the lift device (e.g., on an inclined surface, given a current degradation of the batteries, etc.).

The process 400 includes providing the virtual lift device to the user device for display in a virtual environment of a display screen or in an augmented reality environment (step 412) and operating the user device to display the virtual lift device in the virtual environment on the display screen or in the augmented reality environment (step 414), according to some embodiments. In some embodiments, the user device 114 can operate in a virtual environment mode or in an augmented reality environment mode. When the user device 114 is in the virtual environment mode, the display screen 124 displays the virtual lift device or components of the virtual lift device 204 so that the user can orbit the virtual lift device 204 by operating an orbit button (e.g., operable by touching the display screen 124 of the user device 114 is the display screen 124 is a touch screen). When the user device 114 is in the augmented reality environment, the user can physically walk around the lift device 10 and hold the user device 114 so that the camera 126 of the user device 114 is directed towards the lift device 10. The display screen 124 may display currently obtained image data from the camera 126 with one or more components or all components of the virtual lift device 204 overlaid and tracked onto the currently obtained image data from the camera 126. In this way, the user may physically move about the lift device 10 and hold the user device 114 to view sensor data, predicted values of the virtual lift device 204, purchasable components of the virtual lift device 204, etc.

The process 400 includes obtaining a request from the user device for technically authored content associated with the requested configuration of the virtual lift device or components of the requested configuration of the virtual lift device (step 416), according to some embodiments. In some embodiments, the technically authored content can be requested by providing a user input or request at the user device 114 (e.g., either in the virtual reality environment mode or the augmented reality environment mode). In some embodiments, the technically authored content includes diagnostic information, service manuals, repair manuals, operators manuals, etc., associated with currently installed components of the lift device 10, or potentially installable components of the lift device 10 (e.g., components of the virtual lift device 204).

The process 400 includes retrieving the technically authored content associated with the request from the user device (step 418), providing the technically authored content to the user device for display in the virtual environment of the display screen or in the augmented reality of the display screen (step 420), and operating the user device to display the technically authored content in the virtual environment on the display screen or in the augmented reality environment (step 422), according to some embodiments. In some embodiments, step 418 is performed by the cloud computing system 102. In some embodiments, step 420 is performed by the cloud computing system 102. In some embodiments, the step 422 is performed by the user device 114, or more specifically, by the display screen 124 of the user device 114. Portions of the process 500 may also be performed by at least one of the user device 114 or the display screen 124, according to exemplary embodiments.

Figure 5:
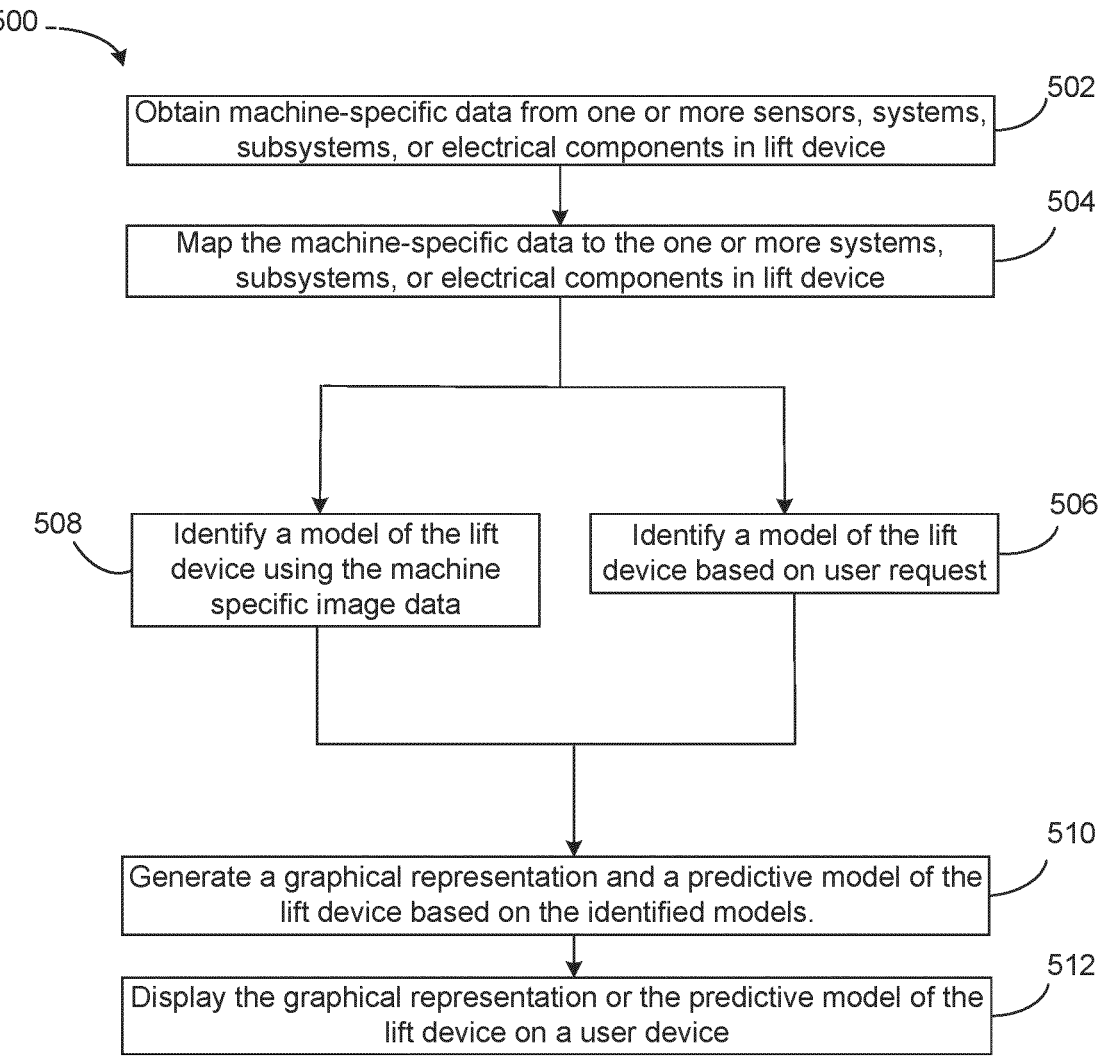
FIG. 5 is a flow diagram of a process for generating and presenting a virtual lift device to a user, based on user request or machine-specific data, according to some embodiments.

Referring now to FIG. 5, a flow diagram of a process 500 for generating a virtual lift device includes steps 502-512, according to some embodiments. In some embodiments, the process 500 is performed by the cloud computing system 102, or by one or more servers, processing circuits, processors, etc.

The process 500 includes obtaining machine-specific data from one or more sensors, systems, sub-systems, or electrical components of a lift device and image data of the lift device (step 502), according to some embodiments. In some embodiments, the step 502 is performed by the cloud computing system 102 and the controller 1500 of the lift device 10. The lift device 10 may include a telemetry system or a wireless transceiver configured to wirelessly communicate with the cloud computing system 102. The controller 1500 can operate the wireless transceiver or the telemetry system to provide processed, unprocessed, or time-series data to the cloud computing system 102. In some embodiments, the controller 1500 also provides tags to the cloud computing system 102 so that portions of the machine-specific data can be associated or mapped (e.g., by the cloud computing system 102) with corresponding sensors, systems, sub-systems, or electrical components of the lift device. In some embodiments, the image data is obtained from an imaging device or camera of a user device or tablet. In some embodiments, the image data is real-time image data. In some embodiments, the image data is a single image or multiple images (e.g., one or more snapshots of the lift device).

The process 500 include mapping the machine-specific data to the one or more sensors, systems, sub-systems, or electrical components of the lift device (step 504), according to some embodiments. In some embodiments, step 504 is performed by the data mapper 116 of the processing circuitry 104 of the cloud computing system 102. In some embodiments, mapping the data includes using the tags and the machine-specific data obtained in step 502 in combination with rules to map or associate portions of the machine-specific data with specific sensors, systems, sub-systems, or electrical components of the lift device 10.

The process 500 includes identifying a model of the lift device using the image data (step 508) and/or obtaining a request from a user device, the request including a requested configuration of the lift device (step 506), according to some embodiments. In some embodiments, the request is provided by a user device such as a desktop computer, a laptop, a smartphone, a lift device computer, etc., or any other device that has Internet connectivity and can communicate with the cloud computing system 102. Identifying the model of the lift device using the machine specific image data can include performing an image analysis or recognition technique to identify the model of the lift device using one or more characteristics extracted from the image data. The characteristics can include textual indications identified on the lift device, arrangement of components of the lift device, size of components of the lift device, shapes of components of the lift device, etc. Step 508 may also be performed using feedback from the lift device reporting the model of the lift device.

The process 500 includes generating a virtual lift device using the models of the lift device components and the mapped machine-specific data, the virtual lift device including a graphical representation and a predictive model of the lift device (step 510), according to some embodiments. In some embodiments, the virtual lift device is a graphical representation of a corresponding real-world lift device. The virtual lift device can be or include a CAD model that illustrates geometry of components of the virtual lift device and configuration or arrangement of the components of the virtual lift device (e.g., interrelationships between the different components of the lift device). In some embodiments, the machine-specific data is mapped to the various components of the virtual lift device and can be displayed or overlaid on the virtual lift device when displayed in a three dimensional environment (e.g., a virtual environment, an augmented reality environment, a virtual reality environment). In some embodiments, the predictive model of the virtual lift device is configured to predict one or more properties of the lift device (e.g., angles, degrees of extension, loads, hydraulic pressures, state of charge of batteries, etc.) as a function of one or more control decisions for the lift device and/or one or more conditions of the lift device (e.g., on an inclined surface, given a current degradation of the batteries, etc.). In some embodiments, the graphical representation and the predictive model of the lift device is displayed on a user device (step 512).

The process 500 includes providing the virtual lift device to the user device for display in a virtual environment of a display screen or in an augmented reality environment (step 512) and operating the user device to display the virtual lift device in the virtual environment on the display screen or in the augmented reality environment (step 512), according to some embodiments. In some embodiments, the user device

114 can operate in a virtual environment mode or in an augmented reality environment mode. When the user device 114 is in the virtual environment mode, the display screen 124 displays the virtual lift device or components of the virtual lift device 204 so that the user can orbit the virtual lift device 204 by operating an orbit button (e.g., operable by touching the display screen 124 of the user device 114 is the display screen 124 is a touch screen). When the user device 114 is in the augmented reality environment, the user can physically walk around the lift device 10 and hold the user device 114 so that the camera 126 of the user device 114 is directed towards the lift device 10.

Referring now to FIG. 6, a flow diagram of process 600 for displaying requested content includes steps 602-610 In some embodiments, process 600 includes operating a user device to display a virtual lift device (step 602). In some embodiments, the virtual lift device is a graphical representation of a corresponding real-world lift device. The virtual lift device can be or include a CAD model that illustrates geometry of components of the virtual lift device and configuration or arrangement of the components of the virtual lift device (e.g., interrelationships between the different components of the lift device). In some embodiments, the machine-specific data is mapped to the various components of the virtual lift device and can be displayed or overlaid on the virtual lift device when displayed in a three dimensional environment (e.g., a virtual environment, an augmented reality environment, a virtual reality environment). In some embodiments, the predictive model of the virtual lift device is configured to predict one or more properties of the lift device (e.g., angles, degrees of extension, loads, hydraulic pressures, state of charge of batteries, etc.) as a function of one or more control decisions for the lift device and/or one or more conditions of the lift device (e.g., on an inclined surface, given a current degradation of the batteries, etc.).

The process 600 includes providing the virtual lift device to the user device for display in a virtual environment of a display screen or in an augmented reality environment (step 602) and operating the user device to display the virtual lift device in the virtual environment on the display screen or in the augmented reality environment (step 602), according to some embodiments. In some embodiments, the user device 114 can operate in a virtual environment mode or in an augmented reality environment mode. When the user device 114 is in the virtual environment mode, the display screen 124 displays the virtual lift device or components of the virtual lift device 204 so that the user can orbit the virtual lift device 204 by operating an orbit button (e.g., operable by touching the display screen 124 of the user device 114 is the display screen 124 is a touch screen). When the user device 114 is in the augmented reality environment, the user can physically walk around the lift device 10 and hold the user device 114 so that the camera 126 of the user device 114 is directed towards the lift device 10. The display screen 124 may display currently obtained image data from the camera 126 with one or more components or all components of the virtual lift device 204 overlaid and tracked onto the currently obtained image data from the camera 126. In this way, the user may physically move about the lift device 10 and hold the user device 114 to view sensor data, predicted values of the virtual lift device 204, purchasable components of the virtual lift device 204, etc.

The process 600 includes obtaining a request from the user device for machine specific content, such as technically authored content associated with the requested configuration of the virtual lift device or components of the requested configuration of the virtual lift device (step 604), according to some embodiments. As used herein, the term "machine specific content" means any of, or any combination of: technically authored content, potential equipment upgrades, compatible equipment or systems, purchasable equipment, or potential replacement components. In some embodiments, the technically authored content can be requested by providing a user input or request at the user device 114 (e.g., either in the virtual reality environment mode or the augmented reality environment mode). In some embodiments, the technically authored content includes diagnostic information, service manuals, repair manuals, operators manuals, etc., associated with currently installed components of the lift device 10, or potentially installable components of the lift device 10 (e.g., components of the virtual lift device 204).

The process 600 includes retrieving the technically authored content associated with the request from the user device (step 606), providing the technically authored content to the user device for display in the virtual environment of the display screen or in the augmented reality of the display screen (step 608), and operating the user device to display the technically authored content in the virtual environment on the display screen or in the augmented reality environment (step 610), according to some embodiments. In some embodiments, step 440 is performed by the cloud computing system 102. In some embodiments, step 606 is performed by the cloud computing system 102. In some embodiments, the step 608 is performed by the user device 114, or more specifically, by the display screen 124 of the user device 114. Steps 602-610 may be the same as or similar to steps 418-422 of process 400.

Referring now to FIG. 7, a flow diagram of process 700 for identifying and displaying machine specific content, such as additional components compatible with the model lift device includes steps 702-712. In exemplary embodiments, machine specific content includes: technically authored content, potential equipment upgrades, compatible equipment or systems, purchasable equipment; or potential replacement components. The process 700 includes identifying a model of the lift device using a request from a user device, the request including a requested configuration of the lift device (step 702), according to some embodiments. In some embodiments, the requested configuration is determined in step 704 to include a potential upgrade to one or more components of the lift device 10, replacement of one or more components of the lift device 10, or installation of additional systems or sensors on the lift device 10 (e.g., installation of an obstacle detection system or a new platform assembly). The potential upgrade to one or more components of the lift device 10, replacement of one or more components of the lift device 10, or installation of additional systems or sensors on the lift device 10 (e.g., installation of an obstacle detection system or a new platform assembly) is retrieved (step 450), according to exemplary embodiments. In some embodiments the information retrieved in step 706 is provided by cloud computing system 102.

The process 700 includes providing the requested model of the lift device to a user device 114 (step 708), according to some embodiments. The requested model of the virtual lift device may be displayed on its own on a user device (step 710). In other embodiments, the requested model of the virtual lift device may be displayed including a notification of the identified potential upgrades, compatible equipment systems, and purchasable items for the lift device on user device 114 (step 712). In some embodiments, step 712 may notify the user of potential upgrades, compatible equipment systems, or purchasable items by overlaying them onto the requested model of the virtual lift device. In exemplary embodiments, the user may use the display screen 124 to view currently obtained image data from the camera 126 with one or more components or all components of the virtual lift device 204 overlaid and tracked onto the currently obtained image data from the camera 126. In this way, the user may physically move about the lift device 10 and hold the user device 114 to view sensor data, predicted values of the virtual lift device 204, purchasable components of the virtual lift device 204, etc. In some embodiments, step 712 may notify a user of identified potential upgrades, compatible equipment systems, or purchasable items by providing a webpage that the user device accesses. In some embodiments, the webpage is provided by the cloud computing system 102 and includes, based on a known type of the lift device 10, a list of potential upgrades, compatible equipment or systems, purchasable items for the lift device 10, etc.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A system for digital twinning a lift device, the system comprising:
    a lift device comprising at least one of a sensor, a device, or an electronic control system;

processing circuitry configured to:
    obtain machine-specific data from the at least one of the sensor, device, or the electronic control system of the lift device;
    obtain a user input regarding a requested configuration of the lift device, the requested configuration including installation of an upgraded lift actuator on the lift device;
    generate a virtual lift device using the requested configuration of the lift device and the machine-specific data obtained from the lift device; and
    operate a user device to present the virtual lift device according to the requested configuration in a virtual environment of a webpage or in an augmented reality environment.

2. The system of claim 1, wherein the virtual lift device comprises a three-dimensional model of the lift device according to the requested configuration and the machine-specific data, wherein different portions of the machine-specific data are mapped to corresponding components of the virtual lift device.

3. The system of claim 2, wherein the virtual lift device further comprises a predictive model configured to predict one or more properties of the lift device for the requested configuration as a function of one or more control decisions for the virtual lift device.

4. The system of claim 2, wherein generating the virtual lift device comprises retrieving one or more three-dimensional models of lift device components according to the requested configuration and assembling the three-dimensional model of the lift device using the one or more three-dimensional models.

5. The system of claim 1, wherein the user device is configured to access the webpage through an Internet connection with the processing circuitry, wherein the webpage is a sales webpage.

6. The system of claim 5, wherein the upgraded actuator is an item to be purchased on the sales webpage.

7. The system of claim 6, wherein the sales webpage comprises a purchase button, the virtual environment, and an orbiting button wherein the virtual lift device is displayed in the virtual environment and is orbited in the virtual environment responsive to user selection of the orbiting button.

8. The system of claim 1, wherein the user device functions as an augmented reality (AR) device, the AR device configured to overlay one or more components of the virtual lift device in the augmented reality environment.

9. A method for displaying a virtual lift device, the method comprising:
    obtaining a plurality of datasets from a lift device;
    generating a digital twin of the lift device, the digital twin comprising:
        the plurality of datasets; and
        a graphical representation or predictive model of the lift device;
    receiving a request, at a user device, to display the digital twin of the lift device; and
    operating a display of the user device to provide the graphical representation of the lift device, one or more of the plurality of datasets, and one or more potential upgrades for an actuator or an obstacle detection system of the lift device in response to the request.

10. The method of claim 9, wherein the plurality of datasets comprise machine specific data retrieved from one or more sensors, systems, sub-systems, or electrical components of the lift device.

11. The method of claim 9, comprising providing the virtual lift device at least one of:

potential upgrades;

compatible equipment or systems;

purchasable items;

potential replacements; or timely maintenance notifications.

12. The method of claim 9, wherein the lift device comprises at least one of a sensor, a system, a sub-system, or an electrical component;

wherein the plurality of datasets of the lift device are obtained from at least one of the sensor, the system, the sub-system, or the electrical component; and wherein each of the plurality of datasets is mapped to one of the sensor, the system, the sub-system, or the electrical component.

13. The method of claim 9 further comprising:

receiving a request, at the user device, to display a specific model configuration of the lift device, wherein the specific model configuration contains potential upgrades, compatible equipment or systems, purchasable items, or maintenance notifications for the lift device;

providing a graphical representation of the specific model configuration and potential upgrades, compatible equipment or systems, purchasable items, or maintenance notifications to the user device; and operating the display of the user device to provide the graphical representation of the specific model configuration and one or more of the potential upgrades, compatible equipment or systems, purchasable items, or timely maintenance notifications for the lift device.

14. The method of claim 13, further comprising:

overlaying the potential upgrades, compatible equipment or systems, purchasable items, or potential replacements onto the graphical representation of the lift device; and operating the display of the user device to provide the graphical representation of the lift device and the potential upgrades, compatible equipment or systems, purchasable items, or potential replacements.

15. The method of claim 13, further comprising:

operating the display of the user device to show maintenance notifications for the lift device on the graphical representation of the lift device.

16. The method of claim 9 further comprising:

receiving a request, at the user device, to display machine specific data regarding technically authored materials for the lift device; and operating the display to provide one or more of the technically authored materials for the lift device.

17. A cloud computing system for a lift device, the cloud computing system comprising:

a cloud device comprising a processor configured to:

wirelessly communicate with a controller of the lift device to obtain machine specific data; and generate a digital twin of the lift device using the machine specific data, the digital twin comprising a graphical representation or a predictive model of the lift device; and a user device comprising a processor and a display, the processor of the user device configured to:

receive one or more digital twins from the processor of the cloud device;

operate the display of the user device to provide the graphical representation or the predictive model of the one or more digital twins and the machine specific data that corresponds to the one or more digital twins;

obtain a request for machine specific content;

retrieve the machine specific content from the cloud computing system; and operate the display of the user device to provide the machine specific content, the machine specific content comprising one or more potential upgrades for a lift apparatus of the lift device.

18. The cloud computing system of claim 17, wherein the machine specific content further comprises at least one of:

technically authored content;

compatible equipment or systems;

purchasable equipment; or potential replacement components.

19. The technically authored content of claim 18, wherein the technically authored content comprises at least one of:

service, operating, or repair manuals;

specific models;

diagnostic information; or installation instructions for new components or systems.

20. The cloud computing system of claim 17, wherein the processor of the cloud device is configured to store the digital twin in a database.

\* \* \* \* \*